US009739685B2

(12) United States Patent
Chernega et al.

(10) Patent No.: US 9,739,685 B2
(45) Date of Patent: Aug. 22, 2017

(54) INTEGRATED, PREDICTIVE VIBRATION ANALYSIS OF ROTATIONAL MACHINE WITHIN ELECTRONICS RACK

(71) Applicant: INTERNATIONAL BUSINESS MACHINES CORPORATION, Armonk, NY (US)

(72) Inventors: Gary J. Chernega, Poughkeepsie, NY (US); Ethan E. Cruz, Lagrangeville, NY (US); Udo Jourdan, Poughkeepsie, NY (US); Budy D. Notohardjono, Poughkeepsie, NY (US); Arkadiy O. Tsfasman, Wappingers Falls, NY (US); Jing Zhang, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 612 days.

(21) Appl. No.: 14/252,990

(22) Filed: Apr. 15, 2014

(65) Prior Publication Data
US 2015/0292937 A1   Oct. 15, 2015

(51) Int. Cl.
*G01M 13/00* (2006.01)
*G01M 13/04* (2006.01)
(Continued)

(52) U.S. Cl.
CPC ............ *G01M 13/00* (2013.01); *G01H 1/003* (2013.01); *G01M 13/045* (2013.01); *G06F 11/0754* (2013.01)

(58) Field of Classification Search
CPC .... G01H 1/006; G01M 13/00; G01M 13/045; G06F 11/0754; G06F 11/079;
(Continued)

(56) References Cited

U.S. PATENT DOCUMENTS 4,237,454 A    12/1980  Meyer
5,610,339 A *  3/1997  Haseley .................. F04C 28/28
                                                           702/56
(Continued)

FOREIGN PATENT DOCUMENTS

CN    101452276 A    6/2009
CN    101532911 A    9/2009
(Continued)

OTHER PUBLICATIONS

Kappa, B., "Predicting Bearing Failures and Measuring Lubrication Film Thickness in Your Plants Rotating Equipment", Water Environment Foundation (WEFTEC, 2006), http://www.environmental-expert.com/Files/5306/articles/13836/470.pdf, (pp. 5969-5974).
(Continued)

*Primary Examiner* — Lisa Caputo
*Assistant Examiner* — Nathaniel T Woodward
(74) *Attorney, Agent, or Firm* — Margaret A. McNamara, Esq.; Kevin P. Radigan, Esq.; Heslin Rothenberg Farley & Mesiti

(57) ABSTRACT

Predictive monitoring of a rotational machine of a cooling apparatus is provided by integrating a predictive vibration analyzer into an electronics rack being cooled by the cooling apparatus. The integrating includes associating at least one sensor of the predictive vibration analyzer with the rotational machine of the cooling apparatus. The analyzer includes a predetermined harmonics table of one or more base operational frequencies and associated rotational speed harmonics for the rotational machine indicative of one or more rotational faults, and the predictive vibration analyzer automatically evaluates vibration of the rotational machine during operation of the machine by analyzing vibration data therefor, and automatically ascertains, based on the vibration data, and the predetermined harmonics table, whether the
(Continued)

rotational machine is predicted to possess a rotational fault of the one or more rotational faults.

10 Claims, 14 Drawing Sheets

(51) Int. Cl.
  *G01H 1/00* (2006.01)
  *G06F 11/07* (2006.01)
(58) Field of Classification Search
  CPC ............. G06F 11/0793; G06F 11/3003; G06F 11/3034; G06F 11/3058; G06F 11/2221; G01F 17/142; G01F 17/18
  USPC ........................................... 73/660; 714/47.2
  See application file for complete search history.

(56) References Cited

U.S. PATENT DOCUMENTS

| | | | | |
|---|---|---|---|---|
| 5,659,195 | A * | 8/1997 | Kaiser | G01P 15/0802 257/369 |
| 6,053,047 | A * | 4/2000 | Dister | G01M 13/028 73/593 |
| 6,199,018 | B1 * | 3/2001 | Quist | G01M 13/028 318/806 |
| 6,321,602 | B1 * | 11/2001 | Ben-Romdhane | F16C 19/52 340/679 |
| 6,415,189 | B1 * | 7/2002 | Hajji | G01M 13/045 324/662 |
| 6,434,512 | B1 | 8/2002 | Discenzo | |
| 6,694,285 | B1 * | 2/2004 | Choe | G01H 1/003 702/182 |
| 7,097,351 | B2 | 8/2006 | Lancon et al. | |
| 7,715,215 | B1 | 5/2010 | Bosco et al. | |
| 2003/0227757 | A1 * | 12/2003 | Vincent | H05K 7/20736 361/796 |
| 2007/0110255 | A1 * | 5/2007 | Barath | G10K 11/1788 381/71.5 |
| 2008/0186194 | A1 * | 8/2008 | Kaminski | G05B 19/4065 340/683 |
| 2008/0189578 | A1 * | 8/2008 | Raghuraman | G06F 11/004 714/47.1 |
| 2009/0093975 | A1 | 4/2009 | Judd | |
| 2009/0299663 | A1 | 12/2009 | Butz et al. | |
| 2010/0139403 | A1 * | 6/2010 | Liang | G01N 29/14 73/587 |
| 2011/0257901 | A1 | 10/2011 | Bechhoefer | |
| 2011/0288796 | A1 | 11/2011 | Peczalski et al. | |
| 2013/0006551 | A1 | 1/2013 | Sako et al. | |
| 2015/0292982 | A1 | 10/2015 | Chernega et al. | |

FOREIGN PATENT DOCUMENTS

| | | |
|---|---|---|
| DE | 10-2004-011848 A | 9/2005 |
| WO | 2007/033258 A1 | 3/2007 |

OTHER PUBLICATIONS

Giuseppe et al., "An Embedded System for Real Time Vibration Analysis", In Advances in Sensors and Interfaces (IWASI), 2011 4th IEEE International Workshop, IEEE 2011 (pp. 6-11).

daCosta et al, "Development of an Instrumentation System Embedded on FPGA for Real Time Measurement of Mechanical Vibrations in Rotating Machinery." Instrumentation & Measurement, Sensor Network and Automation (IMSNA), 2012 International Symposium, IEEE, 2012, vol. 1, (pp. 60-64).

GyroMetric Systems, Inc., "A Unique and Revolutionary Way to Predict Bearing Failure", GyroMetric Systems, Inc., http://www.gyrometricsystems.com/, downloaded Apr. 4, 2014 (11 pages).

Chernega et al., Office Action for U.S. Appl. No. 14/538,198, filed Nov. 11, 2014 (U.S. Patent Publication No. 2015/0292982 A1), dated Feb. 8, 2017 (16 pages).

* cited by examiner

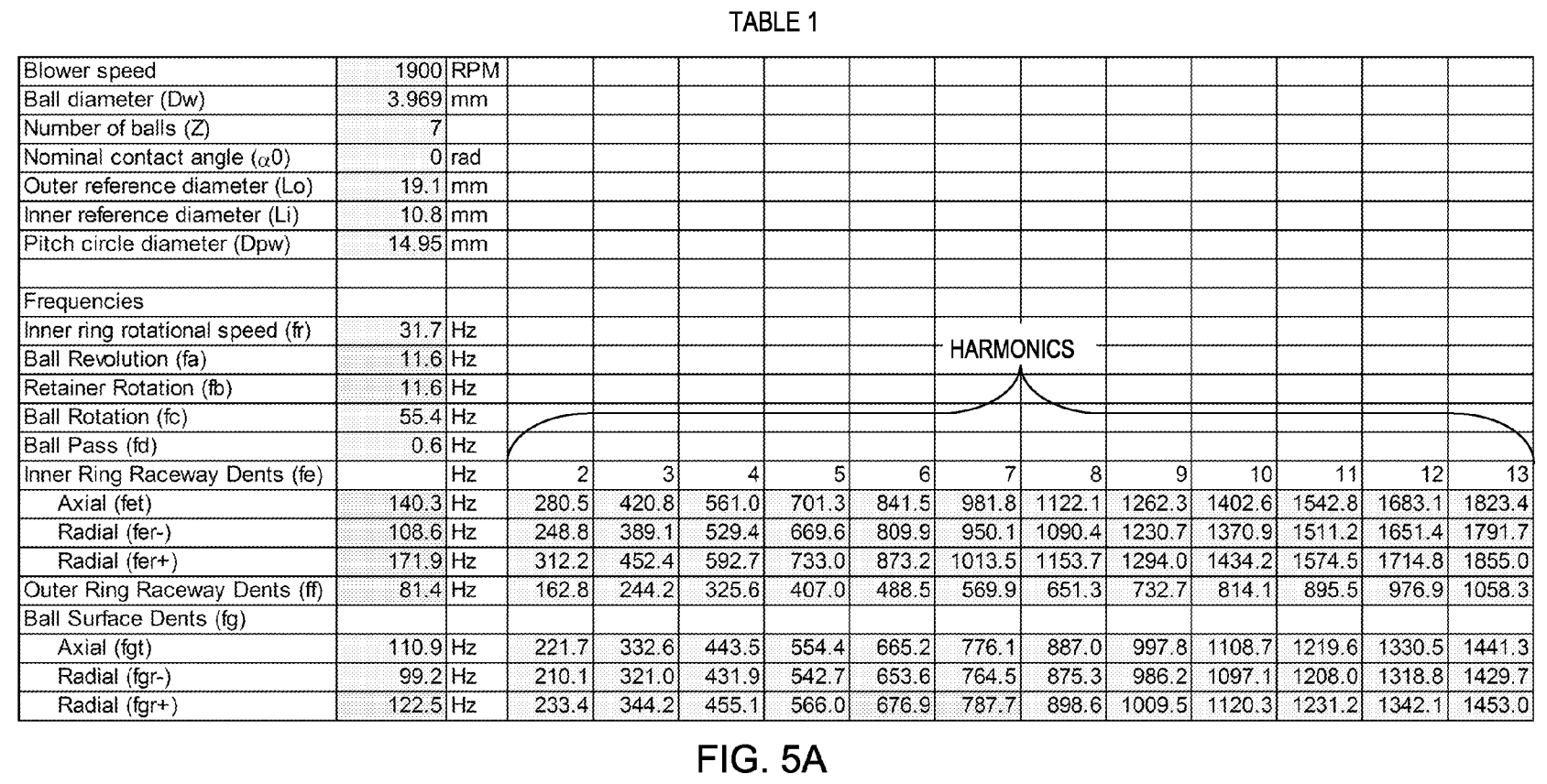

TABLE 1

| | | | 2 | 3 | 4 | 5 | 6 | 7 | 8 | 9 | 10 | 11 | 12 | 13 |
|---|---|---|---|---|---|---|---|---|---|---|---|---|---|---|
| Blower speed | 1900 | RPM | | | | | | | | | | | | |
| Ball diameter (Dw) | 3.969 | mm | | | | | | | | | | | | |
| Number of balls (Z) | 7 | | | | | | | | | | | | | |
| Nominal contact angle (α0) | 0 | rad | | | | | | | | | | | | |
| Outer reference diameter (Lo) | 19.1 | mm | | | | | | | | | | | | |
| Inner reference diameter (Li) | 10.8 | mm | | | | | | | | | | | | |
| Pitch circle diameter (Dpw) | 14.95 | mm | | | | | | | | | | | | |
| Frequencies | | | | | | | | | | | | | | |
| Inner ring rotational speed (fr) | 31.7 | Hz | | | | | | | | | | | | |
| Ball Revolution (fa) | 11.6 | Hz | | | | | | | | | | | | |
| Retainer Rotation (fb) | 11.6 | Hz | | | | | | | | | | | | |
| Ball Rotation (fc) | 55.4 | Hz | | | | | | HARMONICS | | | | | | |
| Ball Pass (fd) | 0.6 | Hz | | | | | | | | | | | | |
| Inner Ring Raceway Dents (fe) | | Hz | 2 | 3 | 4 | 5 | 6 | 7 | 8 | 9 | 10 | 11 | 12 | 13 |
| Axial (fet) | 140.3 | Hz | 280.5 | 420.8 | 561.0 | 701.3 | 841.5 | 981.8 | 1122.1 | 1262.3 | 1402.6 | 1542.8 | 1683.1 | 1823.4 |
| Radial (fer-) | 108.6 | Hz | 248.8 | 389.1 | 529.4 | 669.6 | 809.9 | 950.1 | 1090.4 | 1230.7 | 1370.9 | 1511.2 | 1651.4 | 1791.7 |
| Radial (fer+) | 171.9 | Hz | 312.2 | 452.4 | 592.7 | 733.0 | 873.2 | 1013.5 | 1153.7 | 1294.0 | 1434.2 | 1574.5 | 1714.8 | 1855.0 |
| Outer Ring Raceway Dents (ff) | 81.4 | Hz | 162.8 | 244.2 | 325.6 | 407.0 | 488.5 | 569.9 | 651.3 | 732.7 | 814.1 | 895.5 | 976.9 | 1058.3 |
| Ball Surface Dents (fg) | | | | | | | | | | | | | | |
| Axial (fgt) | 110.9 | Hz | 221.7 | 332.6 | 443.5 | 554.4 | 665.2 | 776.1 | 887.0 | 997.8 | 1108.7 | 1219.6 | 1330.5 | 1441.3 |
| Radial (fgr-) | 99.2 | Hz | 210.1 | 321.0 | 431.9 | 542.7 | 653.6 | 764.5 | 875.3 | 986.2 | 1097.1 | 1208.0 | 1318.8 | 1429.7 |
| Radial (fgr+) | 122.5 | Hz | 233.4 | 344.2 | 455.1 | 566.0 | 676.9 | 787.7 | 898.6 | 1009.5 | 1120.3 | 1231.2 | 1342.1 | 1453.0 |

FIG. 5A

TABLE 2

| Blower speed | 2000 | RPM | | | | | | | | | | | |
|---|---|---|---|---|---|---|---|---|---|---|---|---|---|
| Ball diameter (Dw) | 3.969 | mm | | | | | | | | | | | |
| Number of balls (Z) | 7 | | | | | | | | | | | | |
| Nominal contact angle (α0) | 0 | rad | | | | | | | | | | | |
| Outer reference diameter (Lo) | 19.1 | mm | | | | | | | | | | | |
| Inner reference diameter (Li) | 10.8 | mm | | | | | | | | | | | |
| Pitch circle diameter (Dpw) | 14.95 | mm | | | | | | | | | | | |
| Frequencies | | | | | | | | | | | | | |
| Inner ring rotational speed (fr) | 33.3 | Hz | | | | | | | | | | | |
| Ball Revolution (fa) | 12.2 | Hz | | | | | | | | | | | |
| Retainer Rotation (fb) | 12.2 | Hz | | | | | | | | | | | |
| Ball Rotation (fc) | 58.4 | Hz | | | | | | | | | | | |
| Ball Pass (fd) | 0.6 | Hz | | | | | | | | | | | |
| | | Hz | 2 | 3 | 4 | 5 | 6 | 7 | 8 | 9 | 10 | 11 | 12 | 13 |
| Inner Ring Raceway Dents (fe) | | | | | | | | HARMONICS | | | | | | |
| Axial (fet) | 147.6 | Hz | 295.3 | 442.9 | 590.6 | 738.2 | 885.8 | 1033.5 | 1181.1 | 1328.8 | 1476.4 | 1624.0 | 1771.7 | 1919.3 |
| Radial (fer−) | 114.3 | Hz | 261.9 | 409.6 | 557.2 | 704.9 | 852.5 | 1000.1 | 1147.8 | 1295.4 | 1443.1 | 1590.7 | 1738.3 | 1886.0 |
| Radial (fer+) | 181.0 | Hz | 328.6 | 476.3 | 623.9 | 771.5 | 919.2 | 1066.8 | 1214.5 | 1362.1 | 1509.7 | 1657.4 | 1805.0 | 1952.7 |
| Outer Ring Raceway Dents (ff) | 85.7 | Hz | 171.4 | 257.1 | 342.8 | 428.5 | 514.2 | 599.9 | 685.5 | 771.2 | 856.9 | 942.6 | 1028.3 | 1114.0 |
| Ball Surface Dents (fg) | | | | | | | | | | | | | | |
| Axial (fgt) | 116.7 | Hz | 233.4 | 350.1 | 466.8 | 583.5 | 700.2 | 816.9 | 933.7 | 1050.4 | 1167.1 | 1283.8 | 1400.5 | 1517.2 |
| Radial (fgr−) | 104.5 | Hz | 221.2 | 337.9 | 454.6 | 571.3 | 688.0 | 804.7 | 921.4 | 1038.1 | 1154.8 | 1271.5 | 1388.2 | 1504.9 |
| Radial (fgr+) | 128.9 | Hz | 245.7 | 362.4 | 479.1 | 595.8 | 712.5 | 829.2 | 945.9 | 1062.6 | 1179.3 | 1296.0 | 1412.7 | 1529.4 |

FIG. 5B

PEAK AMPLITUDE TABLE

| VERTICAL (Y DIRECTION) | | HORIZONTAL (X DIRECTION) | | IN-OUT (Z DIRECTION) | |
|---|---|---|---|---|---|
| FREQUENCY (Hz) | AMPLITUDE (PSD) | FREQUENCY (Hz) | AMPLITUDE (PSD) | FREQUENCY (Hz) | AMPLITUDE (PSD) |
| 32.2 | 0.000208 | | | 32.2 | 0.000086 |
| | | | | 101.1 | 0.000147 |
| 113.5 | 0.000119 | 112.8 | 0.000228 | 113.5 | 0.000147 |
| 125.2 | 0.000185 | 126.0 | 0.000223 | 125.2 | 0.001171 |
| 215.3 | 0.001109 | 214.6 | 0.000452 | 215.3 | 0.000439 |
| | | 227.1 | 0.002354 | 227.8 | 0.000363 |
| 238.8 | 0.008038 | 238.8 | 0.011309 | 239.5 | 0.007450 |
| 303.2 | 0.008036 | | | 303.2 | 0.000254 |
| 317.1 | 0.004144 | | | | |
| 328.1 | 0.002832 | 328.1 | 0.000899 | 328.9 | 0.004862 |
| | | 340.6 | 0.018366 | 340.6 | 0.016773 |
| | | 353.0 | 0.001373 | 352.3 | 0.049395 |
| 442.4 | 0.000668 | | | 442.4 | 0.002414 |
| | | 454.8 | 0.000858 | 454.1 | 0.005675 |
| 466.6 | 0.033552 | | | | |
| 579.3 | 0.002287 | | | | |
| 768.3 | 0.002196 | 768.3 | 0.001223 | 768.3 | 0.00098 |

FIG. 10

INTEGRATED, PREDICTIVE VIBRATION ANALYSIS OF ROTATIONAL MACHINE WITHIN ELECTRONICS RACK

BACKGROUND

Electrical power is conventionally supplied to a data processing system by a power supply unit. A power supply unit is a component of a data processing system that transforms, converts, or otherwise conditions electrical power received from, for example, the power grid and provides the transformed, converted, or conditioned electrical power to one or more other components of the data processing system.

In one implementation, a data processing system may reside within one or more racks, and may be, for example, a stand-alone computer processing system having high, mid or low-end processing capability. Power to an electronics rack may be supplied by a bulk power assembly, which includes one or more bulk power regulators. As circuit densities continue to increase at all levels of packaging, and there is an ever-growing need for providing more power to, for instance, an electronics rack comprising one or more electronic subsystems, there is an ever-growing need for continuous cooling of the bulk power assembly. As one solution, a cooling apparatus may be provided comprising one or more bulk power fan assemblies associated with the bulk power assembly for air-cooling the power assembly.

Additionally, as is known, operating electronic devices produce heat. This heat should be removed from the devices in order to maintain device junction temperatures within desirable limits. Failure to remove heat can result in increased device temperatures, potentially leading to thermal runaway conditions. To address this need, an electronics rack may include one or more further cooling apparatuses, which facilitate air-cooling and/or liquid-cooling of one or more electronic devices or components within the electronics rack.

BRIEF SUMMARY

Briefly summarized, provided herein, in one aspect, is a cooled electronic system which includes an electronics rack comprising one or more electronic components to be cooled, and a cooling apparatus integrated within the electronics rack facilitating cooling of the one or more electronic components of the electronics rack. The cooling apparatus includes a rotational machine, and a predictive vibration analyzer associated with the rotational machine for facilitating predictive monitoring of operation of the rotational machine for one or more rotational faults. The predictive vibration analyzer includes: a predetermined harmonics table of one or more base frequencies of vibration and associated harmonics for the rotational machine indicative of one or more rotational faults therein; at least one sensor coupled to the rotational machine to generate vibration data therefor during operation of the rotational machine; and a control monitor programmed to evaluate the vibration data sensed from the rotational machine during operation thereof, and to automatically ascertain based thereon, and based on the predetermined harmonics table, whether the rotational machine is predicted to possess a rotational fault of the one or more rotational faults.

In a further aspect, a computer program product for predictively evaluating a rotational machine of a cooling apparatus to provide cooling to an electronics rack is provided. The computer program product includes a computer-readable storage medium readable by a processor and storing instructions for execution by the processor to perform a method. The method includes: storing a predetermined harmonics table of one or more base frequencies of vibration and associated harmonics for the rotational machine indicative of one or more rotational faults therein; and monitoring vibration of the rotational machine during operation thereof by evaluating vibration data therefor within the electronics rack, and automatically ascertaining based thereon, and based on the predetermined harmonics table, whether the rotational machine is predicted to possess a rotational fault of the one or more rotational faults.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects are particularly pointed out and distinctly claimed as examples in the claims at the conclusion of the specification. The foregoing and objects, features, and advantages of one or more aspects of the invention are apparent from the following detailed description taken in conjunction with the accompanying drawings in which:

FIGS. 5A & 5B depict different examples of a predetermined harmonics table of base frequencies of vibration and associated rotational speed harmonics for a rotational machine, such as a bulk power fan assembly, to be dynamically evaluated, in accordance with one or more aspects of the present invention;

FIG. 10 depicts an example of a peak amplitude table, automatically constructed by a predictive vibration analyzer during evaluation of a rotational machine, and which is useful in accordance with the process flow of FIGS. 9A-9C, in predicting whether the rotational machine possess a rotational fault of one or more rotational faults identified in a predetermined, static harmonics table (such as depicted in FIGS. 5A & 5B), in accordance with one or more aspects of the present invention.

DETAILED DESCRIPTION

As used herein, the term "electronics rack" includes any housing, frame, rack, compartment, blade server system, etc., having one or more components of a data processing system or electronic system, and may be, for example, a stand-alone computer processing system having high, mid or low end processing capability. An electronics rack may comprise at least one electronic subsystem. An "electronic subsystem" refers to any sub-housing, blade, book, drawer, node, compartment, etc., having one or more electronic components disposed therein. Each electronic subsystem of an electronics rack may be movable or fixed relative to the rack, with the electronics drawers of a multi-drawer rack unit and blades of a blade center system being two examples of electronic subsystems of an electronics rack.

Figure 1:
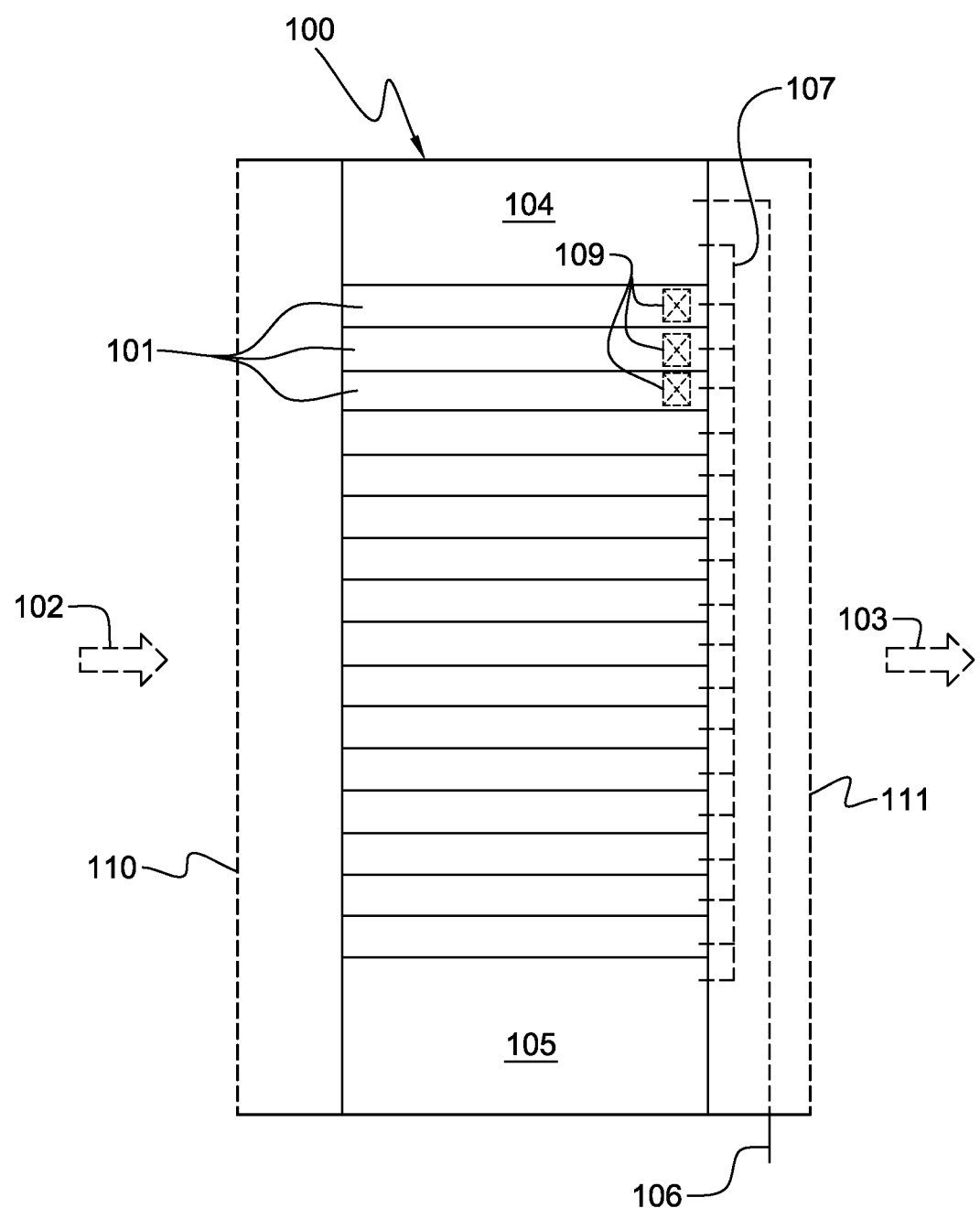
FIG. 1 is an elevational depiction of one embodiment of an electronics rack to incorporate therein a predictive vibration analyzer, in accordance with one or more aspects of the present invention.

FIG. 1 depicts one embodiment of an electronics rack 100 with a plurality of electronic subsystems 101. In the embodiment illustrated, electronic subsystems 101 are air-cooled by cool air 102 ingressing via louvered air inlet door 110, and exhausting out louvered air outlet door 111 as hot air 103. One or more air-moving devices 109 within electronic subsystems 101 may be provided to facilitate airflow through one or more of the individual electronic subsystems 101 as part of the cooling apparatus provided within electronics rack 100. Electronics rack 100 also includes at least one bulk power assembly 104 of an AC-to-DC power supply assembly. AC-to-DC power supply assembly further includes, in one embodiment, a frame controller, which may be resident in the bulk power assembly 104 and/or in one or more electronic subsystems 101. Each electronic subsystem 101 includes, in one example, one or more processors and associated memory. Also illustrated in FIG. 1 is one or more input/output (I/O) drawer(s) 105, which may also include a switch network. I/O drawer(s) 105 include, for example, PCI card slots and disk drivers for the electronics rack.

In implementation, a three-phase AC source feeds power via an AC power supply line cord 106 to bulk power assembly 104, which transforms the supplied AC power to an appropriate DC power level for output via distribution cable 107 to the plurality of electronic subsystems 101 and I/O drawer(s) 105. AC power supply line cord 106 supplies, in one example, three phases for international 415 V.sub-.RMS, and has a current limit rating, for example, of 100 amps. The number of electronic subsystems installed in the electronics rack is variable and depends on customer requirements for a particular system. Further, as explained below, the number of bulk power regulators within each bulk power assembly of the AC-to-DC power supply assembly is also variable and is determined, in one implementation, by the number of electronic subsystems installed in the electronics rack, or more particularly, by the power requirements of the common load of the electronics rack being fed by the AC-to-DC power supply assembly.

Figure 2:
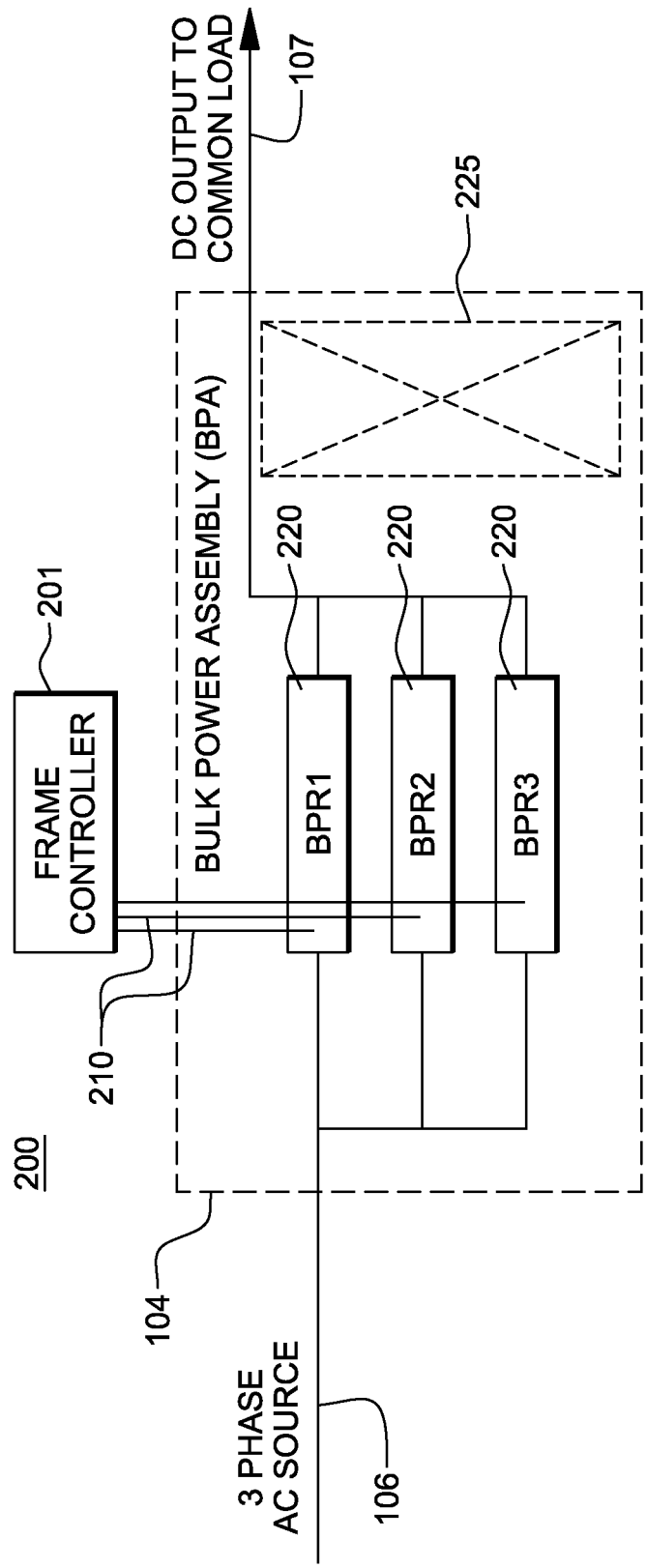
FIG. 2 is a block diagram representation of one embodiment of an AC-to-DC power supply assembly, comprising a bulk power assembly and a frame controller for an electronics rack such as illustrated in FIG. 1, in accordance with one or more aspects of the present invention.

FIG. 2 illustrates one example of an AC-to-DC power supply assembly 200 comprising a frame controller 201 and a bulk power assembly 104, which in this example comprises three single-phase bulk power regulators 220 (labeled BPR1, BPR2 & BPR3). A serial communications bus 210 allows communication between frame controller 201 and bulk power regulators 220 of bulk power assembly 104. The three-phase AC source is input 106 to bulk power assembly 104, and bulk power assembly 104 outputs 107 DC power to a common load. In one typical electronics rack example, 350 volts DC power is output to the common load of the rack from the bulk power assembly.

As illustrated in FIG. 2, cooling of the bulk power assembly is accomplished, in one embodiment, via one or more bulk power fan assemblies 225, which facilitate moving air through bulk power assembly 104 from the air inlet side to the air outlet side of the electronics rack. In addition to the one or more bulk power fan assemblies 225, a cooling apparatus may be provided within the rack for cooling other components of the rack. This cooling apparatus may include one or more air-moving devices within the individual electronic subsystems, such as air-moving devices 109 within the electronic subsystems 101 of electronics rack 100 of FIG. 1. Alternatively, or in addition, the electronics rack cooling apparatus may include a liquid-cooling feature for cooling one or more components, such as one or more electronic components within the electronics rack. For instance, in addition to one or more air-moving devices within the individual electronic subsystems, selected electronic components may be directly or indirectly liquid-cooled.

As one example, one or more processor modules may be indirectly cooled via one or more liquid-cooled cold plates or heat sinks coupled thereto, in which case, the cooling apparatus also comprises a coolant loop coupled to the liquid-cooled heat sink(s) and a coolant distribution subsystem for facilitating liquid coolant flow through the one or more liquid-cooled heat sinks. The coolant distribution subsystem may include one or more coolant pumps in fluid communication with the coolant flowing through the coolant loop to facilitate movement of coolant through the coolant loop. Such a coolant pump is another example of a rotational machine, which may be advantageously monitored within the electronics rack for predicting a rotational fault therein, in accordance with one or more aspects of the present invention.

Thus, a rotational machine, as used herein, may comprise a rotational machine that is part of an air-cooling or a liquid-cooling apparatus for an electronics rack. As one detailed example, the bulk power fan assembly 225 of FIG. 2 is discussed hereinbelow in greater detail. Those skilled in the art will note, however, that the concepts presented are readily applicable to any rotational machine of a rack cooling apparatus, whether an air-cooling rotational machine, or liquid-coolant pump, for advantageously, predictively evaluating whether the machine possesses a rotational fault, either at time of manufacture, before the product is shipped, or at a future time, for example, during normal operation of the rotational machine within the electronics rack.

In order to facilitate continuous operation of a data processing system within, or part of, an electronics rack, the cooling apparatus of the electronics rack should be able to provide continuous cooling for any specified number of power on days of the data processing system. In practice, a failing rotational machine within a cooling apparatus could result in interruption of operation of the data processing system. For instance, a failing bulk power fan assembly, or more particularly, a failing fan bearing assembly of such a fan or blower, could result in an interruption of operation, or at a minimum, degradation in performance, of the rack's data processing system. Currently, a failing rotational machine within a rack might be subjectively detected by an operator hearing an audible change in operation of the rotational machine. For example, a failing bulk power fan assembly could generate excessive noise. Depending on the implementation, with continuous power on days in the range of 50-300, an approximate 10% failure rate might be experienced in the bulk power fan assemblies. Provided herein therefore is a predictive vibration analyzer and analysis method designed to be integrated into the electronics rack to provide a real-time mechanism to predictably monitor for rotational machine failure, such as bearing failure, within the rack.

Figure 3:
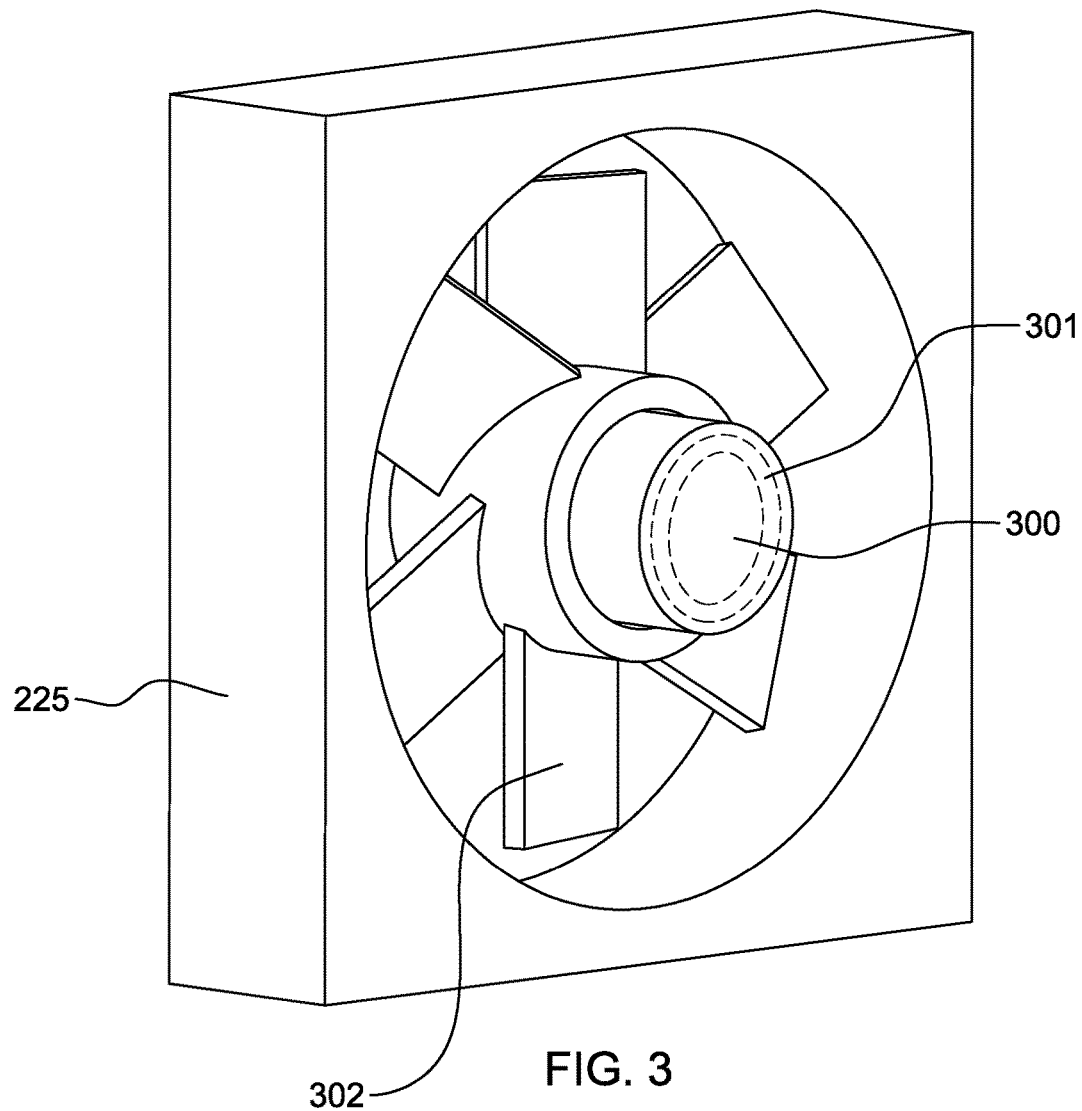
FIG. 3 is a representation of one embodiment of a bulk power fan assembly such as illustrated in FIG. 2, for which predictive vibration analysis may be provided, in accordance with one or more aspects of the present invention.
Figure 4:
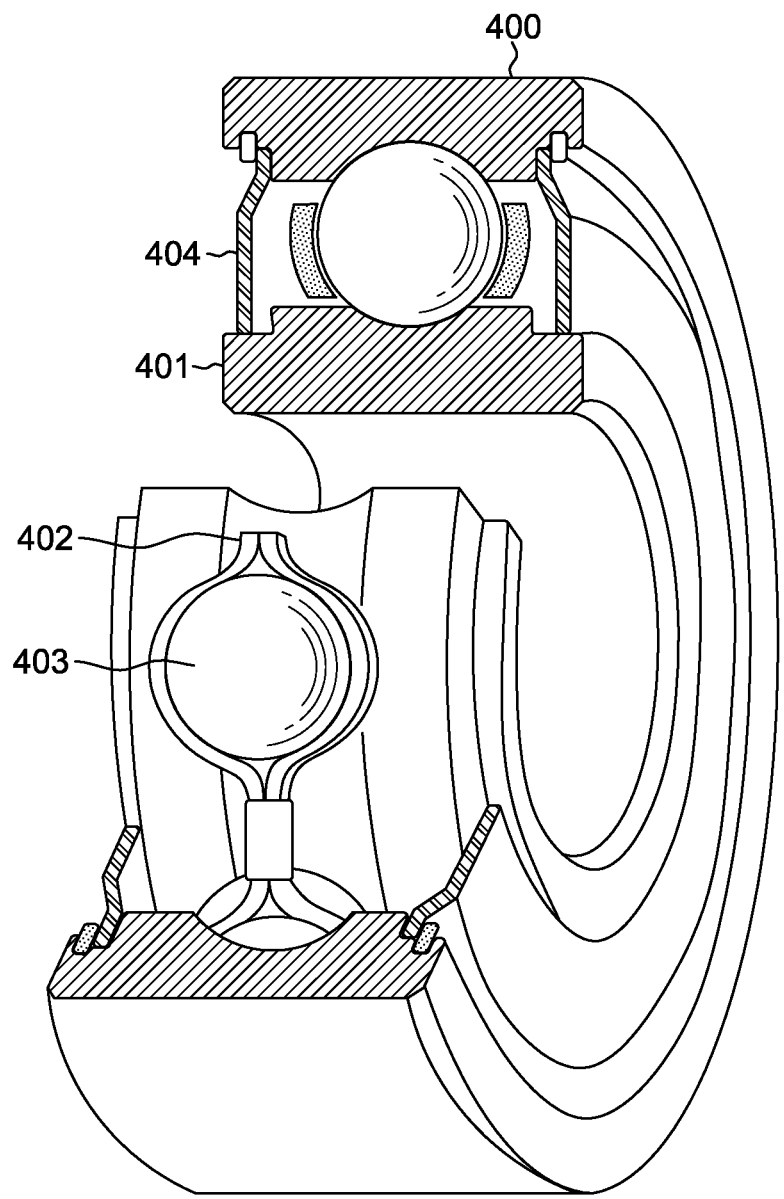
FIG. 4 is a cross-sectional elevational view of one embodiment of a bearing assembly for an air-moving device, such as the bulk power fan assembly of FIG. 3, for which predictive vibration analysis is provided, in accordance with one or more aspects of the present invention.

By way of further explanation, FIG. 3 depicts a block diagram of one embodiment of a bulk power fan assembly 225. In the embodiment shown, bulk power fan assembly 225 includes a motor 300, a ball-bearing assembly 301, and multiple rotating blades 302. FIG. 4 depicts one embodiment of ball-bearing assembly 301 for an air-moving device such as bulk power fan assembly 225 of FIG. 3. As shown, ball-bearing assembly 301 includes, in one embodiment, an outer ring 400 and an inner ring 401 spaced apart to accommodate a cage 402, within which steel balls 403 reside. A metallic shield 404 couples the outer and inner rings 400, 401, and facilitates enclosing the ball-bearings 403 and a lubricant, such as a grease or oil, within the bearing assembly.

A root cause of rotational machine bearing failure, such as a fan assembly bearing failure, may be a high axial load on the bearing. For instance, double the specified loading could reduce bearing life by as much as 75%. A higher axial loading induces a deeper false brinelling. "False brinelling" is damage caused by fretting, with or without corrosion, which causes imprints that look similar to brinelling, but are caused by a different mechanism. Brinell damage is characterized by permanent material deformation (without loss of material), that occurs during one load event, whereas false brinelling is characterized by material wear or removal, and occurs over an extended time from vibration and light loads. A basic cause of false brinelling is that the design of the bearing does not have a method for redistribution of lubricant without large rotational movement of all bearing surfaces in the raceway. Lubricant is pushed out of a loaded region during small oscillatory movements and vibration, where the bearing surfaces repeatedly do not move very far. Without lubricant, wear is increased when the small oscillatory movements occur again. It is possible for the resulting wear and debris to oxidize and form an abrasive compound, which further accelerates wear.

A lower axial load, that is, less bearing spring compression, generally results in longer operational life than a bearing assembly under a higher axial load, which tends to induce deeper false brinelling, and earlier failure potential.

Disclosed herein is the integration of predictive vibration analysis into an electronics rack to provide an early warning, either at the manufacturer, or at a customer site, of a future rotational machine failure based, for instance, on undesirable vibration of the rotational machine resulting from dents or false brinelling of, for instance, one or more components of a bearing assembly of the rotational machine.

Given a bearing assembly type and a specified rotational speed of operation, transformed to frequency, amplitude of vibration caused by ball-bearing revolution is able to be detected by experimentally analyzing the rotating machinery vibration signal. For instance, manual evaluation of operational vibrational signals may be employed in experimentally constructing a static harmonics table such as described below. When a ball, or an inner-ring or outer-ring, such as illustrated in FIG. 4, deform (or dent), the amplitude of the ball revolution increases, and there will be additional vibration caused by such an inner-ring dent, outer-ring dent and/or ball-bearing dent. This manual or experimental vibration analysis can be performed by one of ordinary skill in the art using, in part, one or more existing formulas for ball-bearing assemblies, such as:

$$\text{Vibration caused by ball revolution } (fa) = \frac{1}{2}\left(1 - \frac{D_w}{D_{pw}}\cos\alpha 0\right)fr \quad (1)$$

$$\text{Vibration caused by retainer rotation } (fb) = \frac{1}{2}\left(1 - \frac{D_w}{D_{pw}}\cos\alpha 0\right)fr \quad (2)$$

$$\text{Vibration caused by ball rotation } (fc) = \quad (3)$$
$$\frac{1}{2}\left(\frac{D_{pw}}{D_w} - \frac{D_w}{D_{pw}}\cos^2\alpha 0\right)fr$$

$$\text{Vibration caused by ball pass } (fd) = \left(\frac{Zfa}{Z(fr-fa)}\right) \quad (4)$$

Vibration caused by dents or bumps $(fe)$: $\quad (5)$

Vibration in Axial direction $(fet) = nZ(fr - fa)$ $\quad (5.1)$

Vibration in Radial direction $(fer) = fet \pm fr$ $\quad (5.2)$

From, at least in part, the above-noted Equations, one skilled in the art can ascertain:

Vibration caused by outer ring raceway dents or bumps $(ff)=nZf$ $\quad (6)$

Vibration caused ball surface dents or bumps $(fg)$: $\quad (7)$

Vibration in Axial direction $(fgt)=2nfc$ $\quad (7.1)$

Vibration in Radial direction $(fgr)=fgt\pm fa$ $\quad (7.2)$ wherein:
Dw=Ball diameter (mm);
Dpw=Pitch circle diameter (mm);
α0=Nominal contact angle)(°);
Z=Number of balls;
n=Integer number;
fr=Inner-ring rotation speed (Hz); and
Fr=Outer-ring rotation speed (Hz).

FIGS. 5A & 5B depict examples of two static harmonics tables which may be obtained, or predefined, for a particular rotational machine type for use in predictive analysis of operation of the rotational machine. For instance, the table(s) may be constructed for a particular type of bearing assembly of a cooling apparatus, which is operating at the same speed. Note that in the Table 1 & 2 examples of FIGS.

5A & 5B, the rotational machine comprises an air-moving device (or blower) for, for instance, a bulk power assembly. In the case of Table 1, the blower is specified to operate at 1900 RPMs, while in Table 2, the blower speed is 2000 RPMs. Otherwise, the bearing assembly characteristics, such as the ball diameter, number of balls, nominal contact angle, outer reference diameter, inner reference diameter, and pitch circle diameter, etc., are the same. Note that different frequencies for the inner-ring rotational speed, ball revolution, retainer rotation, ball rotation, and ball paths, may be obtained. Using known equations, such as the above-noted Equations (1)-(7.2), one of ordinary skill in the art can ascertain base vibration frequency values for any inner-ring raceway dents, outer-ring raceway dents, ball surface dents, etc., as illustrated in the Tables. Note that the left-most column for the inner-ring raceway dents, outer-ring raceway dents, and ball surface dents refers to the base frequency of vibration, and the columns to the right refer to harmonic frequencies corresponding to the respective base frequency. Tables 1 & 2 are examples of predetermined harmonics tables of one or more base frequencies and associated rotational speed harmonics for the rotational machine that may be indicative of one or more rotational faults within the machine. In this example, the one or more rotational faults could comprise one or more dents in the inner-ring raceway, outer-right raceway and/or ball surface of the bearing assembly. These predetermined harmonics tables are referred to herein as static tables since they are predefined or predetermined for exemplary faults, referred to herein as rotational faults, in the bearing assembly.

Figure 6:
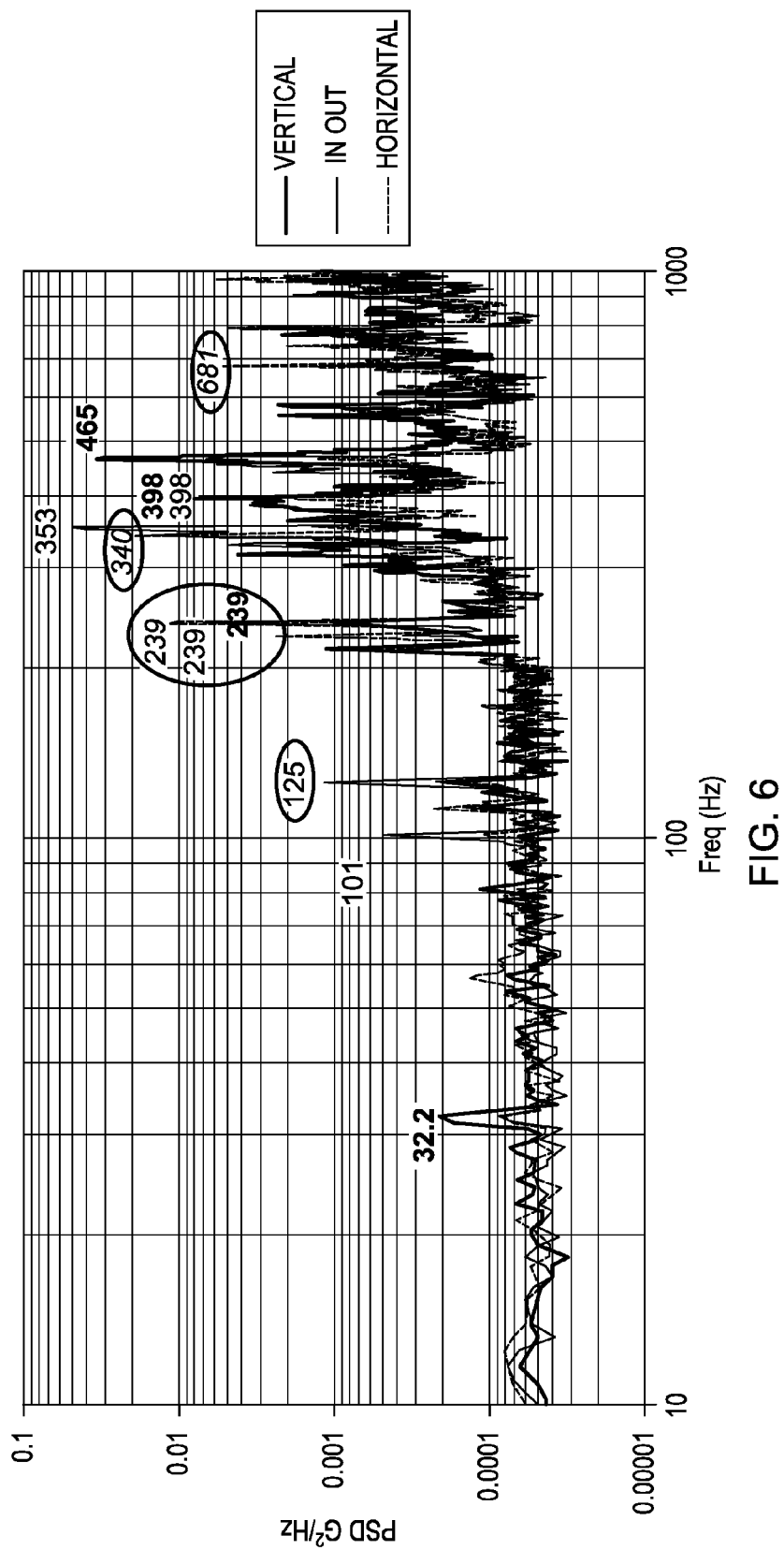
FIG. 6 is an exemplary graph plotting power spectrum density (PSD) acceleration (or amplitude) versus frequency for one bulk power fan assembly, and illustrates amplitude spikes in different x, y, and z directions or channels indicative of one or more rotational faults to be predictively identified, in accordance with one or more aspects of the present invention.

FIG. 6 is a graph of one embodiment of vibration data sampled from a bulk power fan assembly bearing, with an operational rating of 1900 revolutions per minute (RPM). In this graph, vibrations are plotted between sampled frequencies of 10 and 1000 Hz, along with a representation of signal amplitude, such as power spectrum density (PSD) acceleration. As shown, vibration in each of three dimensions is plotted, that is, in x, y and z direction(s) or channel(s). As explained further below, when a peak amplitude signal is identified in multiple directions or channels, a rotational fault may be, to a higher confidence level, predicted to be present in the rotational machine.

Generally stated, provided herein is a predictive failure analyzer and analysis method for real-time vibration monitoring and analysis of a rotational machine within an electronics rack, such as a fan or pump assembly of a cooling apparatus within or associated with the electronics rack. The predictive failure analyzer and analysis method disclosed herein embodies a predictive process which is able to provide an early warning of a rotational fault within a rotational machine of the cooling apparatus. In one implementation, the method includes: integrating a predictive vibration analyzer into an electronics rack, the integrating comprising associating at least one sensor of the predictive vibration analyzer with a rotational machine, of the cooling apparatus to cool one or more components of the electronics rack, to generate vibration data therefor, the predictive vibration analyzer including a predetermined harmonics table of one or more base frequencies of vibration and associated rotational harmonics for the rotational machine indicative of one or more rotational faults therein; and evaluating, by the predictive vibration analyzer, vibration of the rotational machine during operation thereof by analyzing the vibration data, and automatically ascertaining based thereon, and based on the predetermined harmonics table, whether the rotational machine is predicted to possess a rotational fault of the one or more rotational faults.

By way of example, the one or more sensors of the predictive vibration analyzer may include one or more triaxial accelerometers, and the integrating may include coupling the one or more triaxial accelerometers to the rotational machine to facilitate generating the vibration data therefor. Note that in one example, the rotational machine comprises a ball-bearing assembly, and is provided to facilitate movement of a coolant, such as air or a liquid coolant, within the electronics rack to facilitate cooling of one or more components of the electronics rack. Note also, although referred to herein as a single rotational machine, the concepts presented may be readily applied to any number of rotational machines of a cooling apparatus within an electronics rack. For instance, multiple rotational machines may be concurrently monitored for predictive vibration analysis, in accordance with one or more aspects of the present invention disclosed herein.

In one embodiment, the predictive vibration analyzer is configured or programmed to automatically transform the vibration data to a plurality of sample frequency signals with associated signal amplitudes in each of three directions, that is, in x, y, and z directions, and the automatically ascertaining includes generating, from the plurality of frequency signals, a peak amplitude table of sample frequency signals of the plurality of sample frequency signals with peak amplitude values in one, or more, or all three of the x, y, and/or z directions.

By way of example, generating the peak amplitude table may include, for a selected frequency signal of the plurality of sample frequency signals, determining whether the selected frequency signal has a peak signal amplitude by comparing the associated signal amplitude of the selected frequency signal to an average signal amplitude for a window of sample frequency signals, of the plurality of sample frequency signals, about the selected frequency signal, and determining whether the associated signal amplitude of the selected frequency signal exceeds the average signal amplitude of the window of sample frequency signals by a set percentage. For instance, the set percentage may be predefined for a particular rotational machine to be in a range of 150-200%. As one specific example, the set percentage might be 175%.

In one implementation, generating the peak amplitude table may include automatically determining, by the predictive vibration analyzer, whether to add the selected frequency signal to the peak amplitude table when its associated signal amplitude exceeds the average signal amplitude for the window by the predefined percentage. For instance, the automatically determining may include ascertaining whether the peak amplitude table already contains, within a preset frequency range of the selected frequency signal, an existing peak amplitude value, and if so, only substituting for the existing peak amplitude value the selected frequency signal's signal amplitude when that signal amplitude is greater than the existing peak amplitude value in the table. This process may be repeated for the selected frequency signal in each of the x, y and z directions, in one embodiment.

By way of further example, the automatically ascertaining performed by the predictive vibration analyzer may include referencing the predetermined harmonics table and the peak amplitude table in determining for a base frequency vibration in the predetermined harmonics table a count of the number of harmonic frequencies of the base frequency that are present in the peak amplitude table, and if three or more harmonic frequencies are present for the base frequency within a set frequency range, automatically predicting by the predictive vibration analyzer, that the rotational machine possesses the rotational fault of the one or more rotational faults. In one embodiment, this may include determining for the base frequency vibration a number of directions that the associated harmonic frequencies of the base frequency are present in the peak amplitude table, and automatically predicting, by the predictive vibration analyzer, that the rotational machine possesses the rotational fault where associated harmonic frequencies are present in multiple directions.

In one implementation, the determining of the count of the number of harmonic frequencies in the peak amplitude table that are present for each base frequency in the predetermined harmonics table may be repeated, and based thereon, the predictive vibration analyzer may determine whether the rotational machine possesses the rotational fault.

In a further implementation, where three or more harmonic frequencies are identified in the peak amplitude table associated with a particular base frequency, the predictive vibration analyzer may automatically determine whether the base frequency is also present in the peak amplitude table in each of the x, y, and z directions, and if so, automatically indicate that the rotational machine possesses or will possess the rotational fault.

Disclosed herein is a real-time, continuous vibration analysis approach for monitoring a rotational machine, such as an air-moving device or coolant pump within an electronics rack, to detect (for instance) early ball-bearing failure. The predictive vibration analyzer disclosed comprises, in one embodiment, one or more accelerometers or sensors, along with certain data processing of sent signals, and an algorithm to perform vibration analysis FFT (Fast Fourier Transform), as well as a process to compare a table of known bearing vibration values and ball-bearing frequencies. The analyzer is programmed to determine early ball-bearing failure potential in real-time. Increases in amplitude of vibration caused by a ball revolution due to a defect are ascertained, along with additional vibration data caused by inner-ring dents, outer-ring dents, and ball-bearing dents. Analysis is performed in real-time and continuously to compare the previously collected data to the currently obtained data to ensure that there has been no significant change in ball-bearing operation.

In one implementation, an integrated microprocessor and triaxial accelerometer(s) are provided coupled to the rotational machine to obtain and analyze vibration signals from the machine in order to provide predictive failure detection. The analysis approach described herein advantageously finds peaks using a rolling frequency average for a specified frequency range; thus, identifying peaks relative to a rolling background average. The found peak frequencies are compared to frequencies related to bearing failure mechanisms' harmonic frequencies, depending on the operational RPMs of the machine. The bearing failure frequencies may be caused by ball revolution defect, and/or inner-ring dents, outer-ring dents, etc., of the bearing assembly. Analysis is performed in real-time, and continuously, comparing current obtained frequencies with previously collected data to ensure that there has been no significant change in ball-bearing behavior.

Advantageously, the approach described herein may be employed for an initial predictive screening of a rotational machine of the cooling apparatus prior to shipping of any product incorporating the device, as well as post-shipping, to automatically signal, for instance, a control system, of an impending operational problem with the bearing assembly of the rotational machine.

Figure 7:
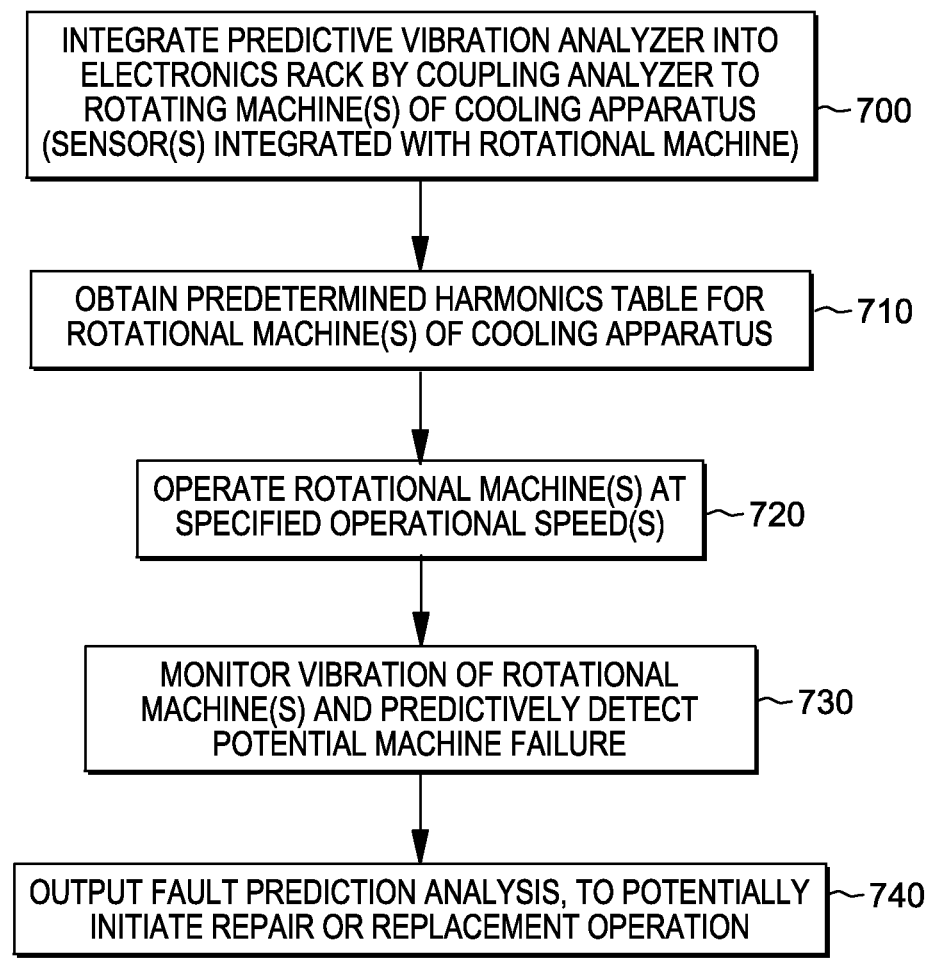
FIG. 7 is a flowchart of one embodiment of real-time, continuous predictive failure analysis of a rotational machine of a cooling apparatus within an electronics rack being provided, in accordance with one or more aspects of the present invention.

FIG. 7 is an overview of one embodiment of a process for predictively monitoring one or more rotational machines of a cooling apparatus associated with an electronics rack. The process includes integrating a predictive vibration analyzer into the electronics rack by coupling one or more sensors of the analyzer to one or more rotational machines of the cooling apparatus within the electronics rack 700. This may be accomplished, in one embodiment, by physically integrating the one or more sensors into, for instance, the bearing assembly of one or more rotational machines within the rack. By way of example, the one or more sensors may comprise accelerometers, such as triaxial accelerometers, which provide three-dimensional vibration data. A predetermined harmonics table is obtained for the rotational machine by, for example, measuring base vibration frequencies, and calculating therefrom corresponding harmonic frequencies for various faults in the rotational machine, such as one or more of the above-described bearing assembly faults 710. Note that, in one embodiment, the predetermined harmonics table may be stored within memory of the predictive vibration analyzer for a particular operational speed of the rotational machine, having been predetermined or predefined experimentally as described above, and remaining substantially static for use as a reference in making the predictive determinations described herein. The rotational machine(s) of the cooling apparatus is then operated at its intended or specified operational speed 720, and the predictive vibration analyzer continuously (e.g., periodically) samples vibration data from the sensor(s) coupled to the rotational machine, and automatically ascertains therefrom, and based on the predetermined harmonics table, whether operation of the rotational machine(s) has change and is now predicted to possess a rotational fault 730. Depending on the implementation, output in the form of a signal may be provided to, for instance, a system controller within the electronics rack, or even to a controller remote from the electronics rack, indicative of whether a rotational fault in the rotational machine has been predicted 740.

Figure 8:
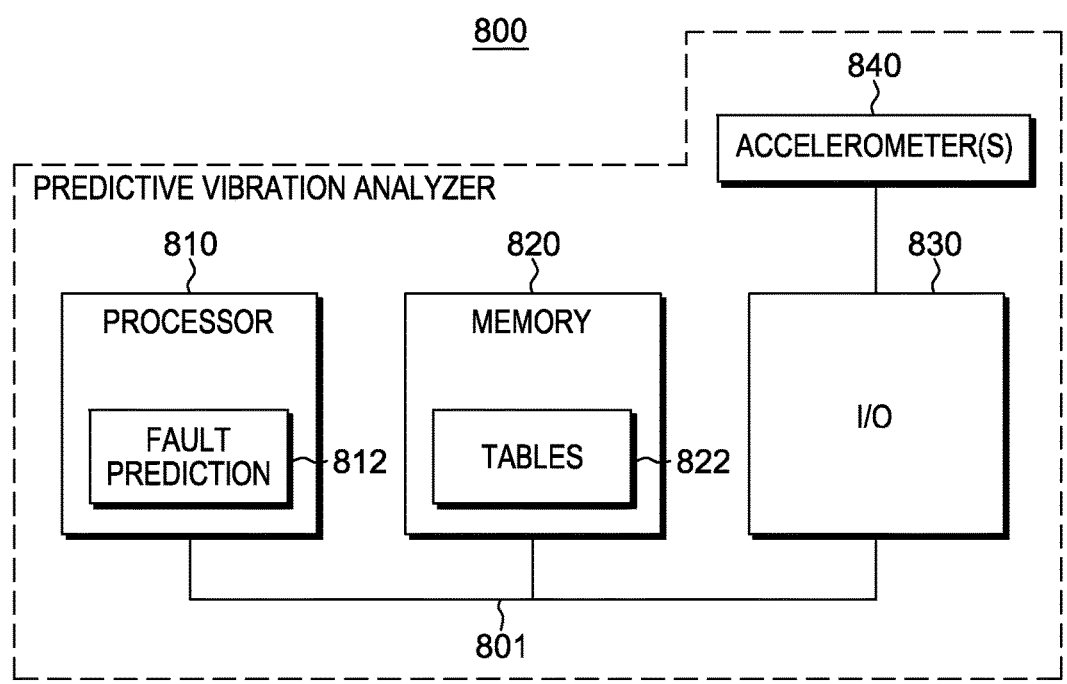
FIG. 8 is a block diagram of one embodiment of a predictive vibration analyzer to be integrated into an electronics rack by in association with a rotational machine of a cooling apparatus, such as a bulk power fan assembly, in accordance with one or more aspects of the present invention.

FIG. 8 is a block diagram of one embodiment of a predictive vibration analyzer, generally denoted 800, to be incorporated into an electronics rack. In the depicted embodiment, predictive vibration analyzer 800 includes one or more processors 810, such as one or more microprocessors, a memory 820 (e.g., main memory), and one or more input/output (I/O) devices 830, coupled to one another via, for instance, one or more busses 801 and/or other connections. The predictive vibration analyzer further includes one or more vibration sensors, such as one or more accelerometers 840, coupled via the input/output device(s) 830 to the processor and memory. The accelerometer(s) may include or be a triaxial accelerometer(s), which provides time-dependent vibration data in x, y, and z directions. In one implementation, the accelerometer(s) is integrated into (for instance, attached to) one or more components of the rotational machine (e.g., bearing assembly) under analysis, in order to provide the vibration data.

As illustrated in FIG. 8, processor 810 executes fault prediction logic 812, such as depicted below in connection with FIGS. 9A-9C, and memory 820 includes (in addition to the fault prediction logic instructions) one or more tables or data structures, such as the predetermined harmonics table and peak amplitude tables described herein.

Note that, in one implementation, the predictive vibration analyzer could comprise a hardware component, such as a micro-electromechanical system (MEMS), programmed to accomplish the processing disclosed herein. As one specific example, the MEMS could comprise an analog device, such as an ADXL326 component. The input voltage, data collection and conversion may be implemented, in one embodiment, in a motor drive assembly (MDA) of the rotational machine. The processor (or microprocessor) employed may be programmed to advantageously performs a Fast Fourier Transform of the sensed time-dependent vibration signals obtained from the accelerometers into sample frequency data, for processing as described herein.

Figure 9A:
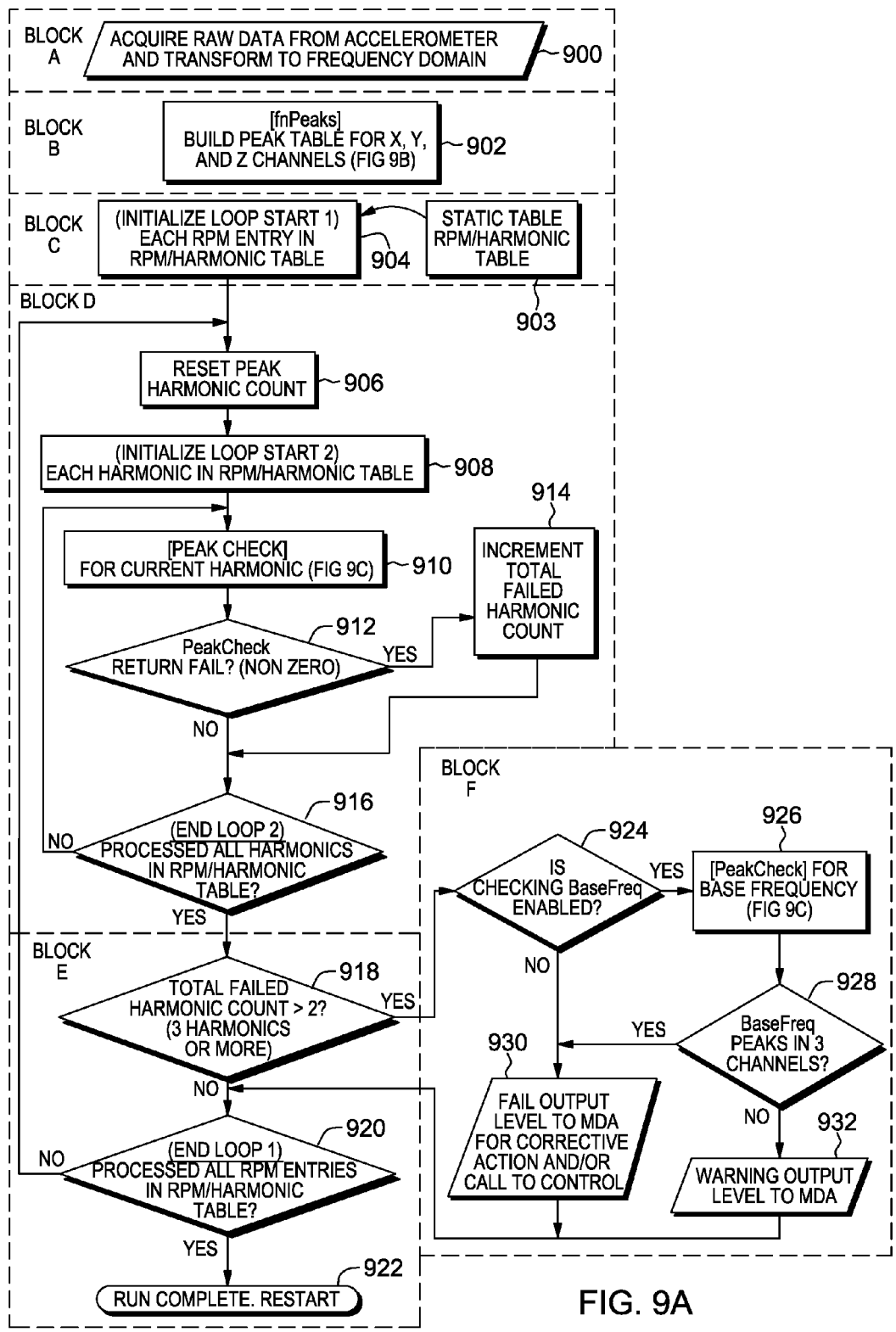
FIGS. 9A-9C depict one embodiment of a process for real-time evaluation, by a predictive vibration analyzer, of vibration data obtained for a rotational machine of a cooling apparatus within an electronics rack, in accordance with one or more aspects of the present invention.
Figure 9B:
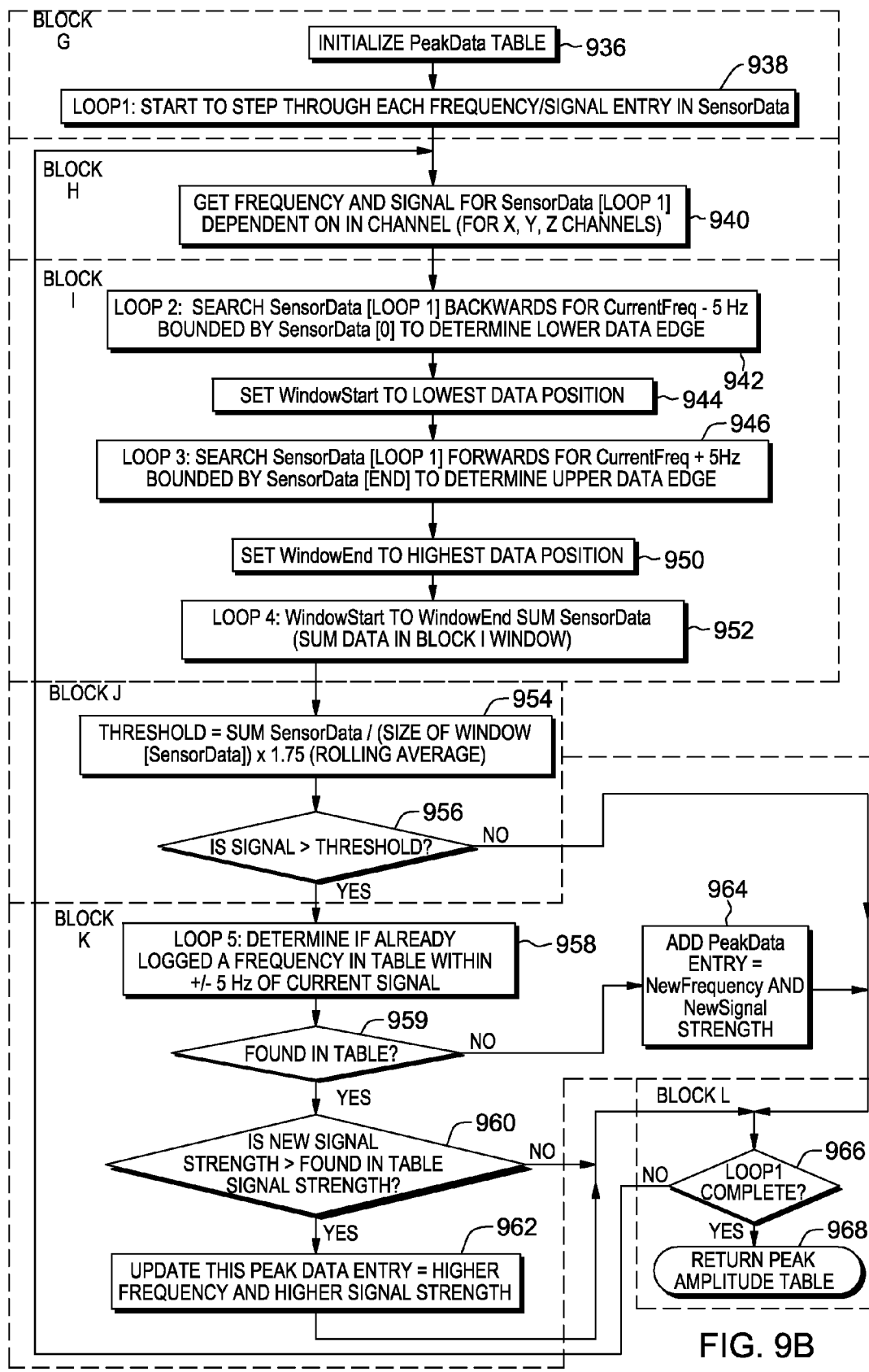
Figure 9C:
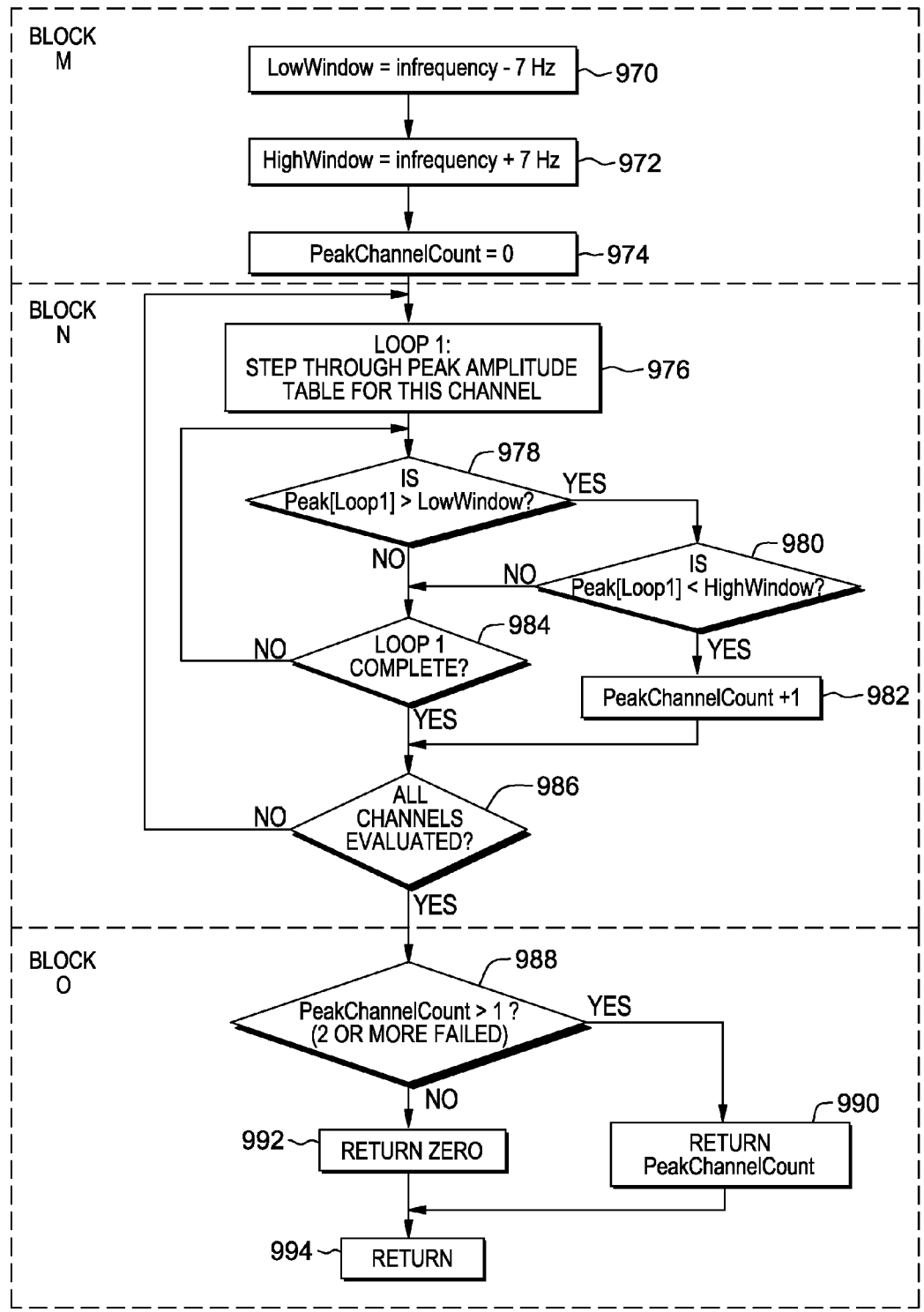

FIGS. 9A-9C depict one embodiment of predictive analysis processing, in accordance with one or more aspects of the present invention. In these figures, FIG. 9A depicts a main, overview process flow, FIG. 9B depicts a peak amplitude detection process, and FIG. 9C depicts one embodiment of peak check processing. The processes are divided into blocks to facilitate a discussion of the flow presented.

Beginning with FIG. 9A, Block A, the predictive vibration analyzer acquires raw vibration data from one or more accelerometers and automatically transforms the data using, for instance, a Fast Fourier Transform (FFT) into frequency domain to provide a plurality of sample frequency signals 900. In one implementation, the FFT may be saved in memory of the predictive vibration analyzer.

In Block B, a call is made to a sub-process to build tables of signal amplitude peaks for x, y, and z directions 902, referred to herein as the peak amplitude tables. One embodiment of this process is outlined in FIG. 9B, and an example of one embodiment of a peak amplitude table is depicted in FIG. 10.

Referring to FIG. 9B, in Block G, an empty peak data table is initialized 936, and used to contain sample frequency and signal amplitude data. Processing starts to step through each sample frequency and associated amplitude entry in the vibration data obtained by the predictive vibration analyzer 938. Note that in the example of FIG. 9B, the initialization for the outer processing loop is for the processes of Blocks H-L, outlined in the figure. A current or selected frequency signal and associated signal amplitude are obtained from the vibration data 940. Note that this process is repeated for each of the three channels (or directions), x, y, and z. Generally, in Block I, processing determines a window of vibration signal data within a set frequency range about the selected frequency signal. The frequency window may be determined during product development, and may be, for instance, −5 Hz to +5 Hz of the selected frequency signal. Once a window of sample frequency signals is determined, an average signal strength for that window can be found. Note that the window may range from +/−0 Hz to +/− the set frequency window (such as 5 Hz), but is a minimum of half the frequency window.

In particular, in Block I, processing searches the vibration data backwards from the selected frequency signal, minus a preset range, such as 5 Hz, bounded by the initial vibration data frequency, to determine a lower window edge 942, and a window start variable is set to this lower data position 944. A similar process occurs for the upper window boundary in that the vibration data is searched forward from the selected frequency to, for instance, signal +5 Hz, bounded by the higher end of the vibration data, to determine the upper window edge 946, and a window end variable is set to the higher window boundary 950. Once the window is ascertained about the selected frequency signal, then data strength within the window is summed to determine a sum of the signal strength within the window 952. A threshold variable is defined as the sum of the vibration data divided by the size of the window, times a preset percentage, such as 1.75 954, as illustrated in Block J. The preset percentage may be determined during product development for a particular rotational machine. An amplitude signal for the selected frequency signal over this associated threshold value above the average window signal strength is determined to be an amplitude peak 956.

In Block K, assuming that a peak amplitude value has been identified, processing determines whether there is an existing peak amplitude value in the corresponding peak amplitude table within a set frequency range 958. If the frequency is not found in the peak amplitude table 959, then the new frequency and associated signal strength are added to the table 964. If the new amplitude signal is greater than such an existing peak amplitude signal in the table 960, then the peak amplitude table is updated with the new signal peak at the current, selected frequency signal 962. Otherwise, processing continues in Block L by determining whether all frequency signals in the vibration data have been processed 966, and if "no", returns to obtain a next selected frequency signal and associated amplitude value for processing 940. Once all sample frequency signals in the vibration data have been processed, the peak amplitude table is complete, and output (for instance, stored in memory) 968, and processing returns to the point of sub-routine call. Note that the peak data table contains the frequency signals with the highest signal amplitudes within the rolling frequency windows.

Returning to the process flow of FIG. 9A, once the peak amplitude tables are constructed 902, processing references in Block C the static, predetermined harmonics table of one or more base frequencies of vibration and associated rotational harmonics for the rotational machine indicative of one or more rotational faults therein 903 (predetermined as described above), and initializes, for each base frequency in the harmonics table 904, an input table of the sample vibration data, to loop through Blocks D-F of the process illustrated.

In Block D, the harmonic frequencies in the predetermined harmonics table are checked to determine, for each base frequency, a number of harmonic frequencies that are present, and in how many channels. Output from this block is a count of amplitude peaks within a frequency window of each harmonic frequency that are present. In particular, in Block D, a peak harmonic count variable is initialized 906, and for each harmonic in the predetermined harmonics table 908, processing performs the peak check process 910 depicted, in one embodiment, in FIG. 9C.

The process of FIG. 9C uses the peak amplitude table(s) built in FIG. 9B, and a selected input (or base frequency) to determine if there is a peak signal in the peak amplitude table within a set frequency range of the selected frequency. In one example, the set range may be predetermined during product development, and may be, for instance, in a range of 5 Hz to 10 Hz, such as 7 Hz. In Block M of FIG. 9C, the window range is defined by a low window variable set to the input frequency −7 Hz 970, and a high window variable set to the input frequency +7 Hz 972. Additionally, a peak channel count variable is initialized to zero 974.

In Block N, the depicted processing is repeated for each x, y, and z channel or direction. Processing inquires whether the current peak is in the frequency window of the input frequency signal in one direction, and if "yes", then the number of failed or peak directions for this input frequency signal is incremented, and processing exits the sub-loop to check data for a next direction or channel. The process repeats for each peak table entry in a given channel.

In particular, as illustrated in Block N, processing steps through the peak amplitude table for a given channel 976, and determines whether the signal frequency in the table for this channel is greater than the low window variable 978. If "yes", then processing determines whether the signal frequency is less than the high window variable 980. If "yes" again, then the peak channel count is incremented 982. Otherwise, if the current frequency signal is outside of the window, processing determines whether all entries in the peak amplitude table have been processed 984, and if "no", returns to process a next entry in the table. Once all entries in a peak amplitude table for a particular direction or channel are complete, processing determines whether all channels have been evaluated 986. If "no", then processing loops back to obtain peak amplitude data for a next direction or channel.

Once all directions have been processed, then in Block O, processing determines whether the peak channel count is greater than 1 988, that is, have two or more channels failed (i.e., been identified with peaks). If "yes", then the failing peak channel count is returned 990, otherwise, a zero value is returned 992, and processing returns 994 to the flow of FIG. 9A.

Returning to the process of FIG. 9A, once the peak amplitude tables have been checked for harmonics, processing determines whether the returned peak check variable indicates a non-zero fail condition 912, and if "yes", then a total failed harmonic count variable is incremented 914. Processing then determines whether all harmonics in the predetermined harmonics table have been processed 916, and if "no", returns to process a next harmonic in the table, with reference to the sub-process of FIG. 9C.

In Block E, processing determines whether three or more harmonic frequencies for a given base frequency have been identified in the peak amplitude tables 918, and if three or more are present, proceeds (in one example) to the processing of Block F, otherwise continues to check a next base frequency for harmonics. In particular, as illustrated in Block E, processing determines whether the total failed harmonic count exceeded two, that is, have at least three harmonics been identified 918, and if "no", determines whether all base frequencies in the predetermined harmonics table have been considered 920, and if "no" again, returns to consider harmonics for a next base frequency.

Assuming that three or more harmonics have been identified, then processing determines in Block F whether a warning or fail condition should be immediately issued based, in one example, on consideration of the base frequency itself. In particular, processing determines whether base frequency checking is enabled 924, and if "no", sends a fail output level to, for instance, the motor drive assembly, for corrective action, and/or signals a controller remote from the predictive vibration analyzer to initiate operator action to service the rotational machine 930. Assuming that the base frequency checking is enabled, then for the base frequency, the peak check sub-processing of FIG. 9C is initiated 926, and processing determines whether a base frequency peak has been identified in all three channels, that is, in the x, y, and z directions 928. If "yes", then the fail output signal is sent, otherwise (in one embodiment), a warning output level signal 932 may be sent to, for instance, the motor drive assembly associated with the rotational machine. After sending the signals, processing determines whether all entries in the predetermined harmonics table have been considered, and if "yes", completes the current process flow 922, which as noted, may be repeated periodically in a continuous manner during operation of the rotational machine within the electronics rack.

FIG. 10 depicts one embodiment of a peak amplitude signal table for x, y, and z directions, referred to in the table as the vertical, horizontal, and in/out directions, wherein the frequencies of the identified peak signals are recorded along with the associated signal amplitudes for each of the directions. Note in the representative example provided in FIG. 10 that similar peak signals are identified in multiple channels or directions for a given frequency signal. In those cases where the frequency signal has a peak in multiple directions, a potential failure may be predicted with confidence, in accordance with the processing disclosed herein.

Advantageously, provided herein is a predictive vibration analyzer and analysis approach, integrated with a rotational machine, such as a bearing assembly of a cooling apparatus or component, within an electronics rack. In accordance with the predictive failure algorithm/analysis described above, a predicted failure of a rotational machine (e.g., bearing assembly) may be identified during testing at a manufacturer or during normal operation at, for instance, a customer site. Once identified, a preventive action may then be taken automatically by the predictive vibration analyzer. See in this regard, the processes of FIGS. 7 & 9A, described above. For instance, once the predictive vibration analyzer determines that there is a failing output for a bearing assembly, the analyzer may automatically initiate action to limit damage to the bearing assembly and/or to surrounding components within the electronics rack. For instance, the predictive vibration analyzer could automatically stop operation of the rotational machine, or modify operation of the rotational machine by, for instance, changing its speed of operation. As one example, if the rotational machine is specified to operate at 1900 RPMs, then the predictive vibration analyzer could automatically change the speed of operation to, for instance, 1800 RPMs, to possibly allow for continued operation of the rotational machine at the reduced speed. As another example, either commensurate with automatic control of the rotational machine, or in the case of outputting a warning, an operator could be automatically signaled to evaluate the results of the predictive vibration analyzer, and possibly take further action, such as to repair or replace the rotational machine.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Figure 11:
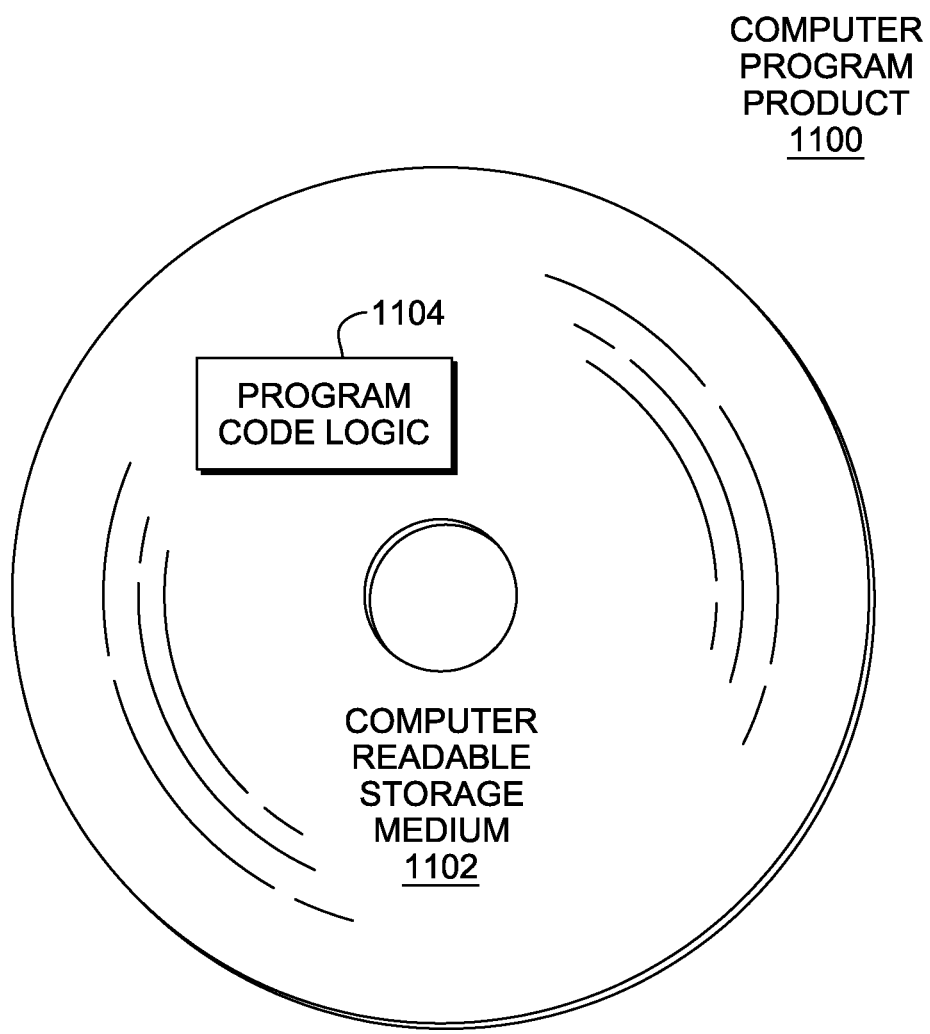
FIG. 11 depicts one embodiment of a computer program product incorporating one or more aspects of the present invention.

Referring to FIG. 11, in one example, a computer program product 1100 includes, for instance, one or more non-transitory computer readable storage media 1102 to store computer readable program code means, logic and/or instructions 1104 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

What is claimed is:

1. A cooled electronic system comprising:
    an electronics rack comprising one or more electronic components to be cooled; and
    a cooling apparatus integrated within the electronics rack for facilitating cooling the one or more electronic components of the electronics rack, the cooling apparatus comprising a rotational machine, and a predictive vibration analyzer associated with the rotational machine for facilitating predictive evaluation of operation of the rotational machine, the predictive vibration analyzer comprising:
        a predetermined harmonics table of one or more base frequencies of vibration and associated rotational harmonics for the rotational machine indicative of one or more rotational faults therein;
        at least one sensor coupled to the rotational machine to generate vibration data therefor during operation of the rotational machine; and
        a control monitor programmed to evaluate the vibration data sensed from the rotational machine during operation thereof, and to automatically ascertain based thereon, and based on the predetermined harmonics table, whether the rotational machine is predicted to possess a rotational fault of the one or more rotational faults; and
    wherein the control monitor transforms the vibration data into a plurality of sample frequency signals with associated amplitudes and generates, from the plurality of sample frequency signals, a peak amplitude table of sample frequency signals of the plurality of sample frequency signals, the generating including, for a selected frequency signal of the plurality of sample frequency signals, determining whether the selected frequency signal has a peak signal amplitude by:
        comparing the associated signal amplitude of the selected frequency signal to an average signal amplitude for a window of sample frequency signals, of the plurality of sample frequency signals, about the selected frequency signal within a set frequency range; and
        determining whether the associated signal amplitude of the selected frequency signal exceeds the average signal amplitude for the window of sample frequency signals within the set frequency range by a preset percentage.

2. The cooled electronic system of claim 1, wherein the at least one sensor comprises one or more triaxial accelerometers coupled to the rotational machine to facilitate generating the vibration data therefor in multiple directions.

3. The cooled electronic system of claim 1, wherein the control monitor automatically generates, from the plurality of sample frequency signals, a peak amplitude table of sample frequency signals of the plurality of sample frequency signals with peak amplitude values in at least two of an x, y, or z direction.

4. The cooled electronic system of claim 1, wherein generating the peak amplitude table further comprises automatically determining, by the predictive vibration analyzer, whether to add the selected frequency signal to the peak amplitude table when its associated signal amplitude exceeds the average signal amplitude for the window by the defined percentage, the automatically determining comprising ascertaining whether the peak amplitude table already contains, within a preset frequency range of the selected frequency signal, an existing peak amplitude value, and if so, substituting for the existing peak amplitude value the selected frequency signal's signal amplitude within the peak amplitude table when that signal amplitude is greater than the existing peak amplitude value.

5. The cooled electronic system of claim 4, wherein the control monitor automatically repeats the determining whether the selected frequency signal possesses a peak amplitude signal to evaluate the selected frequency signal in each of the x, y, and z directions.

6. The cooled electronic system of claim 1, wherein the control monitor of the predictive vibration analyzer automatically references the predetermined harmonics table and the peak amplitude table in determining for a base frequency of vibration in the predetermined harmonics table a count of a number of harmonic frequencies of the base frequency that are present in the peak amplitude table, and if three or more harmonic frequencies are present for the base frequency within a set frequency range, automatically predicting, by the predictive vibration analyzer, that the rotational machine possesses the rotational fault of the one or more rotational faults.

7. A computer program product for predictively evaluating a rotational machine of a cooling apparatus to provide cooling to an electronics rack, the computer program product comprising:
    a computer-readable storage medium readable by a processor and storing instructions for execution by the processor to perform a method comprising:
        storing a predetermined harmonics table of one or more base frequencies of vibration and associated rotational harmonics for the rotational machine indicative of one or more rotational faults therein;
        monitoring vibration of the rotational machine during operation thereof by evaluating vibration data therefor within the electronics rack, and automatically ascertaining based thereon, and based on the predetermined harmonics table, whether the rotational machine is predicted to possess a rotational fault of the one or more rotational faults; and
    wherein the automatically ascertaining comprises transforming the vibration data into a plurality of sample frequency signals with associated amplitudes and generating, from the plurality of sample frequency signals, a peak amplitude table of sample frequency signals of the plurality of sample frequency signals, the generating including, for a selected frequency signal of the plurality of sample frequency signals, determining whether the selected frequency signal has a peak signal amplitude by:
        comparing the associated signal amplitude of the selected frequency signal to an average signal amplitude for a window of sample frequency signals, of the plurality of sample frequency signals, about the selected frequency signal within a set frequency range; and determining whether the associated signal amplitude of the selected frequency signal exceeds the average signal amplitude for the window of sample frequency signals within the set frequency range by a preset percentage.

8. The computer program product of claim 7, wherein the monitoring automatically generates, from the plurality of sample frequency signals, a peak amplitude table of sample frequency signals of the plurality of sample frequency signals with peak amplitude values in at least two of an x, y, or z direction.

9. The computer program product of claim 7, wherein generating the peak amplitude table further comprises automatically determining, by the predictive vibration analyzer, whether to add the selected frequency signal to the peak amplitude table when its associated signal amplitude exceeds the average signal amplitude for the window by the defined percentage, the automatically determining comprising ascertaining whether the peak amplitude table already contains, within a preset frequency range of the selected frequency signal, an existing peak amplitude value, and if so, substituting for the existing peak amplitude value the selected frequency signal's signal amplitude within the peak amplitude table when that signal amplitude is greater than the existing peak amplitude value.

10. The computer program product of claim 9, wherein the monitoring automatically repeats the determining whether the selected frequency signal possesses a peak amplitude signal to evaluate the selected frequency signal in each of the x, y, and z directions.

\* \* \* \* \*